United States Patent
Liang et al.

(10) Patent No.: US 11,782,727 B2
(45) Date of Patent: Oct. 10, 2023

(54) READ PREDICTION DURING A SYSTEM BOOT PROCEDURE

(71) Applicant: Micron Technology, Inc., Boise, ID (US)

(72) Inventors: Qing Liang, Boise, ID (US); Nadav Grosz, Broomfield, CO (US); Jonathan S. Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 209 days.

(21) Appl. No.: 16/888,198

(22) Filed: May 29, 2020

(65) Prior Publication Data
US 2021/0373907 A1    Dec. 2, 2021

(51) Int. Cl.
*G06F 9/4401*    (2018.01)
*G06F 12/0877*   (2016.01)

(52) U.S. Cl.
CPC ........ *G06F 9/4403* (2013.01); *G06F 12/0877* (2013.01); *G06F 2212/603* (2013.01)

(58) Field of Classification Search
CPC . G06F 12/0877; G06F 12/0886; G06F 9/4403
See application file for complete search history.

(56) References Cited

U.S. PATENT DOCUMENTS

| 2012/0110241 A1 | 5/2012 | Lam et al. |
| 2017/0031823 A1* | 2/2017 | Ross .................. G06F 12/0862 |
| 2019/0129834 A1 | 5/2019 | Purkayastha et al. |
| 2021/0182075 A1* | 6/2021 | Jain ...................... G06F 9/4401 |

FOREIGN PATENT DOCUMENTS

WO    2019129834 A1    7/2019

OTHER PUBLICATIONS

ISR/WO, "International Search Report and Written Opinion of the International Searching Authority," issued in connection with Int'l Appl. No. PCT/US2021/033173, dated Sep. 15, 2021 (12 pages).

* cited by examiner

*Primary Examiner* — Baboucarr Faal
(74) *Attorney, Agent, or Firm* — Holland & Hart LLP

(57) ABSTRACT

Methods, systems, and devices for read prediction during a system boot procedure are described. A memory device may identify a command for a boot procedure and transfer data stored in a memory array to a cache of the memory device. In some cases, the memory device may prefetch data used during the boot procedure and thereby improve the latency of the boot procedure. When the memory device receives a command that requests data stored in the memory array as part of the boot procedure, the memory device may identify a cache hit based on prefetching the requested data before the command is received. In such cases, the memory device may retrieve the prefetched data from the cache.

25 Claims, 5 Drawing Sheets

READ PREDICTION DURING A SYSTEM BOOT PROCEDURE

BACKGROUND

The following relates generally to one or more memory systems and more specifically to read prediction during a system boot procedure.

Memory devices are widely used to store information in various electronic devices such as computers, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source. FeRAM may be able to achieve densities similar to volatile memory but may have non-volatile properties due to the use of a ferroelectric capacitor as a storage device.

DETAILED DESCRIPTION

Figure 1:
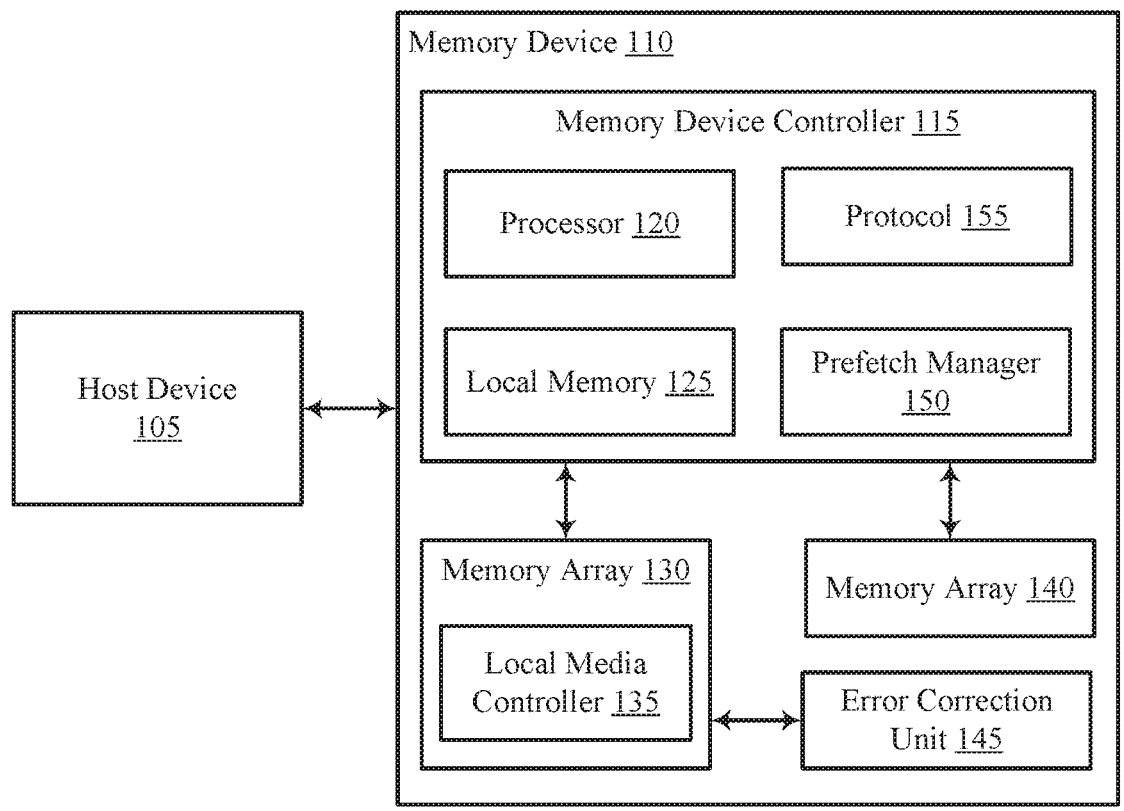
FIG. 1 is an example of a computing system that includes a memory device in accordance with examples as disclosed herein.

Some systems (e.g., electronic devices, smart phones, etc.) may take a particular amount of time to boot-up. For example, the host device may request data from a memory device of the system during a boot-up procedure. In some cases, boot-up procedures may be expanding such that the host device requests increased amounts of data during a boot-up procedure which may use a particular amount of time to read the data. It may be desirable to improve a user's experience by reducing the boot-up time of the overall system and increase efficiency of the memory device. The amount of time to boot-up may result in the memory device experiencing a performance loss, increased signaling overhead, and increased processing overhead for performing operations. In such cases, underutilizing the time during boot-up may decrease performance of the memory device, increase power consumption, or the like.

Systems, devices, and techniques are described for a memory device to prefetch at least some information during the boot-up procedure of a host device. The memory device may record the received host commands in a sequential order, thereby generating and storing a boot sequence used during the boot-up procedure. In such cases, the memory device may identify (e.g., predict) a candidate for a next command of a boot procedure based on the boot sequence stored on the memory device. At the memory device's following boot-up procedure, the memory device may load data associated with the candidate for the next command from its memory array to a cache (e.g., shared memory). For example, the memory device may pre-load (e.g., prefetch) data from a memory device that acts as storage (e.g., negative-and (NAND) type flash memory) to the cache before receiving a request for the data from the host device. In some cases, the memory device may utilize the memory device's idle time to pre-load data using the recorded boot sequence. In such cases, the prefetching can reduce the time used to implement the boot-up procedure by increasing the quantity of cache hits experienced during the boot-up procedure. If the command received from a host device matches the prefetched data, the memory device may respond with data directly from the cache, thereby reducing command latency and allowing for more efficient and faster boot procedures. Because the prefetched data may be stored in cache, the host device may access the prefetched data more quickly than the backend procedures used for reading data from NAND each time a command is issued. Such techniques may increase the performance of the memory device experiencing improved read speeds, reduced power consumption, decreased processing complexity, and improved processing times.

Features of the disclosure are initially described in the context of a computing environment as described with reference to FIG. 1. Features of the disclosure are described in the context of a flow chart as described with reference to FIG. 2. These and other features of the disclosure are further illustrated by and described with reference to an apparatus diagram and flowcharts that relate to read prediction during a system boot procedure as described with reference to FIGS. 3-5.

FIG. 1 is an example of a computing system 100 that includes a memory device 110 in accordance with examples as disclosed herein. The memory device 110 may include media, such as one or more volatile memory devices (e.g., memory array 140), one or more non-volatile memory devices (e.g., memory array 130), or a combination of such.

A memory device 110 may be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile DIMM (NVDIMM).

The computing system 100 may be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 may include a host device 105 that is coupled with one or more memory devices 110. In some examples, the host device 105 is coupled with different types of memory devices 110. FIG. 1 illustrates one example of a host device 105 coupled with one memory device 110. As used herein, "coupled to" or "coupled with" generally refers to a connection between components, which may be an indirect communicative connection or direct communicative connection (e.g., without intervening components), whether wired or wireless, including connections such as electrical, optical, magnetic, etc.

The host device 105 may include a processor chipset and a software stack executed by the processor chipset. The processor chipset may include one or more cores, one or more caches, a memory controller (e.g., NVDIMM controller), and a storage protocol controller (e.g., PCIe controller, SATA controller). The host device 105 uses the memory device 110, for example, to write data to the memory device 110 and read data from the memory device 110.

The host device 105 may be coupled to the memory device 110 using a physical host interface. Examples of a physical host interface include, but are not limited to, a serial advanced technology attachment (SATA) interface, a peripheral component interconnect express (PCIe) interface, universal serial bus (USB) interface, Fiber Channel, a double data rate (DDR) memory bus, Small Computer System Interface (SCSI), Serial Attached SCSI (SAS), a dual in-line memory module (DIMM) interface (e.g., DIMM socket interface that supports DDR), etc. The physical host interface may be used to transmit data between the host device 105 and the memory device 110. The host device 105 may further utilize a non-volatile memory Express (NVMe) interface to access the memory components (e.g., memory device(s) 130) when the memory device 110 is coupled with the host device 105 by the PCIe interface. The physical host interface may provide an interface for passing control, address, data, and other signals between the memory device 110 and the host device 105. The host device 105 may access multiple memory devices via a same communication connection, multiple separate communication connections, and/ or a combination of communication connections.

The memory array 140 may include any combination of the different types of non-volatile memory devices and/or volatile memory devices. The volatile memory devices (e.g., memory array(s) 140) may be, but are not limited to, random access memory (RAM), such as dynamic RAM (DRAM) and synchronous DRAM (SDRAM).

Some examples of non-volatile memory devices (e.g., memory array 130) includes a NAND type flash memory and write-in-place memory, such as a three-dimensional cross-point ("3D cross-point") memory device, which is a cross-point array of non-volatile memory cells. A cross-point array of non-volatile memory may perform bit storage based on a change of bulk resistance, in conjunction with a stackable cross-gridded data access array. Additionally, in contrast to many flash-based memories, cross-point non-volatile memory may perform a write in-place operation, where a non-volatile memory cell may be programmed without the non-volatile memory cell being previously erased. NAND type flash memory includes, for example, two-dimensional NAND (2D NAND) and three-dimensional NAND (3D NAND).

Each of the memory arrays 130 may include one or more types of memory cells. One type of memory cell, for example, single level cells (SLC) may store one bit per cell. Other types of memory cells, such as multi-level cells (MLCs), triple level cells (TLCs), and quad-level cells (QLCs), may store multiple bits per cell. In some examples, each of the memory arrays 130 may include one or more arrays of memory cells such as SLCs, MLCs, TLCs, QLCs, or any combination of such. In some examples, a particular memory device may include an SLC portion, and an MLC portion, a TLC portion, or a QLC portion of memory cells. The memory cells of the memory arrays 130 may be grouped as pages that may refer to a logical unit of the memory device used to store data. With some types of memory (e.g., NAND), pages may be grouped to form blocks.

Although non-volatile memory devices such as 3D cross-point array of non-volatile memory cells and NAND type flash memory (e.g., 2D NAND, 3D NAND) are described, the memory array 130 may be based on any other type of non-volatile memory, such as read-only memory (ROM), phase change memory (PCM), self-selecting memory, other chalcogenide based memories, ferroelectric transistor random-access memory (FeTRAM), ferroelectric RAM (Fe-RAM), magneto RAM (MRAM), Spin Transfer Torque (SST)-MRAM, conductive bridging RAM (CBRAM), resistive random access memory (RRAM), oxide based RRAM (OxRAM), negative-or (NOR) flash memory, and electrically erasable programmable ROM (EEPROM).

The memory device controller 115 (or controller 115 for simplicity) may communicate with the memory arrays 130 to perform operations such as reading data, writing data, or erasing data at the memory arrays 130 and other such operations. The memory device controller 115 may include hardware such as one or more integrated circuits and/or discrete components, a buffer memory, or a combination of such. The hardware may include a digital circuitry with dedicated (i.e., hard-coded) logic to perform the operations described herein. The memory device controller 115 may be a microcontroller, special purpose logic circuitry (e.g., a field programmable gate array (FPGA), an application specific integrated circuit (ASIC), a digital signal processor (DSP)), or other suitable processor.

The memory device controller 115 may include a processor 120 (e.g., a central processing unit) configured to execute instructions stored in a local memory 125 (e.g., a cache). The local memory 125 may be an example of a magnetic RAM (MRAM). In the illustrated example, the local memory 125 of the memory device controller 115 includes an embedded memory configured to store instructions for performing various processes, operations, logic flows, and routines that control operation of the memory device 110, including handling communications between the memory device 110 and the host device 105.

In some examples, the local memory 125 may include memory registers storing memory pointers, fetched data, etc. The local memory 125 may also include read-only memory (ROM) for storing micro-code. In some examples of the present disclosure, a memory device 110 does not include a memory device controller 115, and may instead rely upon external control (e.g., provided by an external host, or by a processor or controller separate from the memory sub-system).

In general, the memory device controller 115 may receive commands or operations from the host device 105 and may convert the commands or operations into instructions or appropriate commands to achieve the desired access to the memory arrays 130 and/or the memory array 140. The memory device controller 115 may be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory arrays 130. The memory device controller 115 may further include host interface circuitry to communicate with the host device 105 via the physical host interface. The host interface circuitry may convert the commands received from the host system into command instructions to access the memory arrays 130 and/or the memory array 140 as well as convert responses associated with the memory arrays 130 and/or the memory array 140 into information for the host device 105.

The memory device 110 may also include additional circuitry or components that are not illustrated. In some examples, the memory device 110 may include a cache or buffer (e.g., DRAM) and address circuitry (e.g., a row decoder and a column decoder) that may receive an address from the memory device controller 115 and decode the address to access the memory arrays 130.

In some examples, the memory arrays 130 include local media controllers 135 that operate in conjunction with memory device controller 115 to execute operations on one or more memory cells of the memory arrays 130. An external controller (e.g., memory device controller 115) may externally manage the memory array 130 (e.g., perform media management operations on the memory array 130). In some examples, a memory array 130 is a managed memory device, which is a raw memory device combined with a local controller (e.g., local controller 135) for media management within the same memory device package. An example of a managed memory device is a managed NAND (MNAND) device.

The memory array 130 may be in communication with an error control unit 145 (ECU). The ECU may perform operations such as error detection operations, error correction operations, error correcting code operations, or a combination thereof. In some cases, a portion of the NAND of the memory array 130 may store the replay script (e.g., boot sequence). The replay script may include the commands and addresses of the boot procedure to track the location during the boot procedure.

The memory device 110 may include a prefetch manager 150 that may identify a command for a boot procedure. The prefetch manager 150 may transfer data stored in a memory array 130 to a cache of the memory device 110. For example, the memory device 110 may prefetch data and store the data in a shared memory of the memory device 110 (e.g., the local memory 125 in some cases). The memory device 110 may receive a command that requests data stored in the memory array during the boot procedure. The memory device 110 may identify that the data transferred to the cache is the same data requested by the command. For example, the memory device 110 may identify a cache hit. The memory device 110 may retrieve the prefetched data from the cache and output the data to the host device 105.

In some examples, the memory device controller 115 includes at least a portion of the prefetch manager 150. For example, the memory device controller 115 may include a processor 120 (e.g., a processing device) configured to execute instructions stored in local memory 125 for performing the operations described herein. In some examples, the prefetch manager 150 is part of or in communication with the host device 105, an application, or an operating system. The memory device controller 115 may include a protocol 155. The protocol 155 may interface with the host device 105.

The prefetch manager 150 may detect a boot procedure. In some cases, the boot procedure may include one or more boot phases. The boot phases of the boot procedure may include a Uboot phase (e.g., boot partition), an authentication phase using a replay protected memory block (RPMB) partition, a pre-boot phase to select which operating system image to update, and an operating system boot phase. The prefetch manager 150 may improve or reduce the time used during the boot procedure to boot-up the system. Further details with regards to the operations of the prefetch manager 150 are described below.

The system 100 may include non-transitory computer readable medium (e.g., local memory 125, memory array 130, and/or memory array 140) storing instructions (e.g., firmware) for performing the techniques for read prediction during a system boot procedure (e.g., methods 200, 400, and 500), described herein. For example, the instructions, when executed by controller 115 (or more specifically processor 120 of controller 115), may cause the controller to perform the methods for mapping descriptors described herein.

Figure 2:
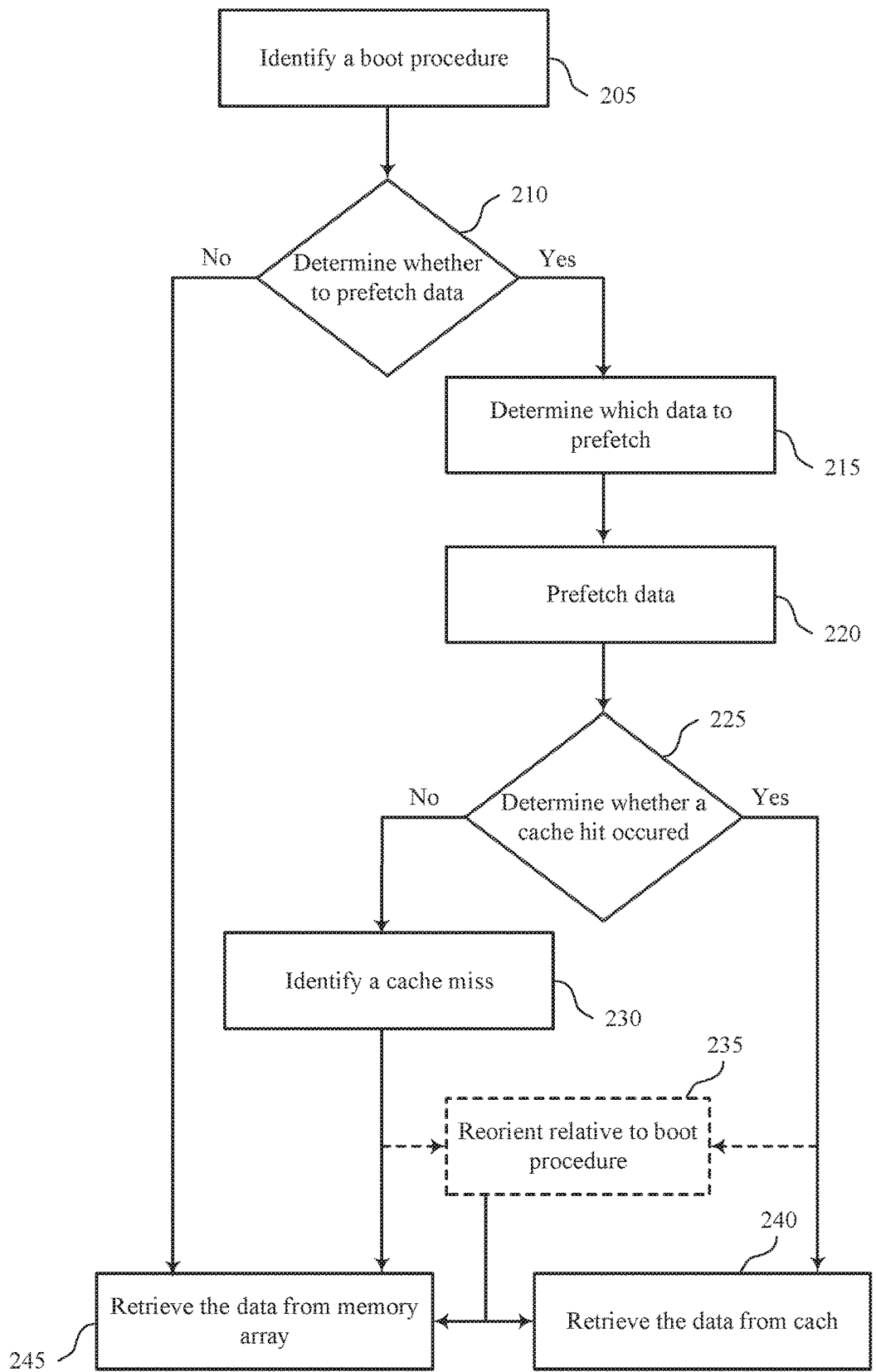
FIG. 2 is a flow diagram of an example method that supports read prediction during a system boot procedure in accordance with examples as disclosed herein.

FIG. 2 is a flow diagram of an example method that supports read prediction during a system boot procedure in accordance with examples as disclosed herein. The method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some examples, the method 200 may be performed by a memory device or a system of memory devices as described with reference to FIGS. 1 and 3. In some examples, a memory device may execute a set of codes to control the functional elements of the memory device to perform the functions described below. Additionally or alternatively, the memory device may perform aspects of the functions described below using special-purpose hardware. In some examples, the method 200 is performed by the prefetch manager 150 described with reference to FIG. 1. Although shown in a particular sequence or order, unless otherwise specified, the order of the processes may be modified. Thus, the illustrated examples are used as examples, and the illustrated processes may be performed in a different order, and some processes may be performed in parallel. Additionally, one or more processes may be omitted in various examples. Thus, not all processes are used in every example. Other process flows are possible.

At 205, an occurrence of a boot procedure may be identified. For example, a memory device may identify a command for a boot procedure. The boot procedure may occur when the host device powers up (e.g., turns on) or when an application associated with the host device is activated. For example, a boot procedure may occur when an operating system implemented by the host device is activated. A timer, counter, or other components within the memory device may detect the amount of data sent to the host device during the boot procedure. For example, the memory device may count (e.g., identify) the amount of data sent to the host device until the boot procedure is complete. In some cases, the timer or counter may count a quantity of LBAs sent to the host device. During the boot procedure, the data may be transferred from the memory device to the host device.

The boot procedure may also occur when the host device sends a signal to the memory device that the boot procedure is requested. In such cases, the host device may send a signal (e.g., a flag) to the memory device indicating a time to start the boot procedure and end the boot procedure (e.g., indicating that the boot procedure is complete). The memory device may include a command sequence detector to detect a command sequence that signifies a boot start time and a boot end time. In some examples, the memory device may receive a next command of the boot procedure.

The system boot procedure may be recorded. For example, a memory device may record a boot sequence (e.g., replay script) of the boot procedure and store it in the memory array. The boot sequence may be a list that identifies the partition, LBA address, and size of the boot procedure. In some examples, the boot sequence may include a list of sequential commands. In some cases, the memory device may modify the stored boot sequence based on detecting a change to the boot procedure.

At 210, it may be determined whether to prefetch data. In some cases, the memory device may determine whether performing the boot procedure uses prefetched data. If the memory device determines that the boot procedure or an aspect of the boot procedure does not use prefetched data or prefetch data, the method 200 may proceed to 240 where the data is retrieved from the memory array.

If it is determined that the boot procedure uses prefetched data or includes the prefetching of data, the method 200 may proceed to 215. In some cases, the memory device may determine whether to prefetch data based on identifying a candidate for a next command of the boot procedure. In such cases, the memory device may identify the candidate for the next command based on the boot sequence stored in the memory array of the memory device. Identifying the candidate for the next command may be based on storing the boot sequence, modifying the boot sequence, and/or identifying the amount of data transferred from the memory device to the host device during the boot procedure. In some cases, the data for multiple candidates may be stored in the cache at the same time. While the method 200 describes performing a single prefetching for a single candidate, the prefetching of data may be ongoing process. For example, the cache may store data for multiple candidates and may be ahead of the performance of the boot procedure by one or more steps or one or more prefetches.

In some cases, the memory device may determine whether to prefetch data based on determining whether the address of the candidate for the next command is in the boot sequence of the boot procedure. For example, the memory device may identify an address the data stored in the memory array indicated by the candidate for the next command.

At 215, it may be determined which data to prefetch. For example, the memory device may determine which data to prefetch based on a size of the data, based on a type of data, or both. In some examples, large blocks of data may be prefetched, while smaller blocks of data may not be prefetched. In some examples, static data (e.g., data that is the same or is stored in the same location during every boot procedure) may be prefetched, but random access data (e.g., data that is changed frequently or changes its location) may not be prefetched. The memory device may replay a LBA sequence for the type of data and size of reads to determine which data to prefetch.

For example, the memory device may record large blocks of data (e.g., host read data) and prefetch the data based on the size (e.g., prefetch large blocks of data). In such cases, the memory device may identify that the data associated with the candidate satisfies a size threshold. In other examples, the memory device may identify that the data associated with the candidate exceeds a size threshold. The memory device may skip the prefetch of data based on the size. For example, the memory device may skip the prefetch of data associated with requests for relatively small amounts of data. In such cases, the memory device may identify that the data associated with the candidate is below a size threshold and refrain from outputting the data stored in the cache based on identifying that the data associated with the candidate is below the size threshold. In some cases, the memory device may prefetch the data associated with small, random reads and store the data in the cache, but the memory device may retrieve (e.g., output) the large blocks of data from the cache rather than the small, random reads. In such cases, the small, random reads (e.g., data that is below the size threshold) may remain in the cache.

The memory device may determine which data to prefetch based on the type of data. For example, the memory device may prefetch data based on determining the that the data is fixed data (e.g., sequential data). The memory device may determine whether the address of the requested data is sequential to the address of the data stored in the cache. In such cases, the boot sequence may include portions of a fixed boot sequence at a fixed LBA, and the memory device may determine which data to prefetch based on the fixed boot sequence. Prefetching data based on detecting the fixed boot sequence may increase an amount of prefetched data and increase the accuracy of performing a cache hit.

In some cases, the memory device may receive a flag from the host device that identifies which part of the boot procedure is static (e.g., sequential). For example, the memory device may detect a sequential access portion of the boot procedure based on determining that the address of the requested data is sequential to the address of the stored data. In such cases, outputting the data may be based on determining the sequential access portion of the boot procedure (e.g., determining that the address of the requested data is sequential to the address of the stored data).

In other examples, the memory device may receive a flag from the host device that identifies which part of the boot procedure is dynamic (e.g., random). For example, the memory device may detect a random access portion of the boot procedure based on identifying that the data requested by the next command is not stored in the cache. In such cases, the data stored in the memory array may be outputted based on detecting the random access portion of the boot procedure.

At 220, the data may be prefetched. For example, the memory device may transfer, to the cache of the memory device, data stored in the memory array indicated by the candidate for the next command. The data may be prefetched based on receiving the next command. In some examples, the memory device may preload (e.g., prefetch) data regardless of a position within the boot procedure.

Data may be prefetched during at least a portion of an idle period of the boot procedure. In some boot procedures there may be periods where the memory device may be more active and periods where the memory device may be less active (e.g., the idle period). Such techniques may leverage more idle periods to perform the prefetching and thereby decrease the latency of the boot procedure. In such cases, the memory device may determine a window of idle time for prefetching the data during the boot procedure. The memory device may identify the window of idle time via a timestamp such that when the next boot procedure occurs, the memory device may identify the idle period to prefetch data. A boot timer and idle time detection unit of the memory device may detect that a boot procedure is occurring and that there is a window of time for prefetching data such that the data may be prefetched in the background of the boot procedure. After the memory device records the time stamp, the memory device may identify the window to prefetch data, thereby improving the idle time usage. Rather than using resources to fetch data every time a read request is received, the memory device may prefetch the data for the reads indicated in the boot sequence, thereby decreasing the processing time, overhead, and power consumption.

Prefetching data during the idle time may allow the memory device to prefetch the data without delaying or negatively affecting the other components (e.g., host device, shared memory of the system, etc.) and operations of the memory device (e.g., the boot procedure). The memory device may prefetch data from the NAND and store in portions of the cache (e.g., shared memory). The portions of the cache used to store prefetched data may not otherwise be used for the boot procedure. In such cases, the portions of the cache that may be idle during the boot procedure may be available for storage of prefetched data without negatively affecting other components of the memory device. In such cases, when the host device issues the next boot procedure, the data is already stored in the shared memory, and the next boot sequence is not processed by the backend, thereby decreasing processing times and increasing efficiency.

In some cases, the memory device may include hardware for static RAM (SRAM) allocation during the boot procedure (e.g., redundant array of independent NAND (RAIN) parity, garbage collection table ram, write versus read buffer allocation). In such cases, the memory device may prefetch data to store in the cache rather than using a host read data buffer allocation with a read and write buffer. For example, the SRAM and direct memory access (DMA) prefetcher may fill the read buffer from L2P table (e.g., logical and/or physical addresses).

In some examples, the boot sequence may be parsed (e.g., sliced) to prefetch parts of the boot sequence up to a predetermined size. In some examples, the memory device may parse out unused prefetched data for the next boot procedure from the boot sequence. In such cases, during each boot procedure, an additional amount of data may be prefetched to allow the boot sequence to dynamically grow while also parsing out parts of the boot sequence such that each boot procedure adds prefetched data that may result in a cache hit.

At 225, it may be identified whether a cache hit occurred. For example, the memory device may receive a command from the host device that requests data stored in the memory array as part of the boot procedure. The cache hit may occur when the memory device identifies that the data requested by the command is the data already stored in the cache (e.g., prefetched data). The memory device may search the boot sequence and match the addresses of the data requested by the command to the data stored in the cache. For example, the memory device may identify that the address of the memory array for the data requested by the command (and indicated by the command) and matches an address of the memory array associated with the data stored in the cache. If the memory device determines that the cache hit occurred, the method 200 may proceed to operation 235.

If the host device splits the read into two segments, the boot procedure may not match because the address and size associated with the read does not match the size of each individual segment, rather the address associated with the read may match the size of the combined individual segments. In such cases, the prefetched data may be in the cache such that a first cache hit may occur for the first segment and a second cache hit may occur for the second segment. If the memory device determines that the cache hit did not occur, the method 200 may proceed to operation 230.

At 230, a cache miss may be identified, which means that the data requested by the command of the boot procedure is not stored in the cache. For example, the memory device may determine that the address indicated by the command is not the next address in the boot sequence. The memory device may identify that the data requested by the next command is not stored in the cache. In some cases, the memory device may output, to the host device, the data stored in the memory array based on identifying that the data requested by the next command is not stored in the cache. The memory device may discard the stored data corresponding to the data prior to the address associated with the data requested by the next command. For example, the memory device may evict, from the cache, the data associated with the candidate based on outputting the data stored in the memory array.

In some cases, the host device may modify the boot sequence. In such cases, the prefetched data may not be associated with the modified boot sequence. A cache miss may occur based on the modified boot sequence, and the memory device may evict the prefetched data from the cache. In other examples, the memory device may identify that the data stored in the cache is not the same as the data requested by the command. In such cases, the memory device may discard the data stored in the cache and the data requested by the command. In other examples, the memory device may wait to discard the data stored in cache and the data requested by the command until the next data requested by the command is identified as the data stored in the cache.

At 235, the prefetch procedure may be reoriented relative to the boot procedure, if it is determined that the prefetch procedure is misaligned with the boot procedure. The memory device may be unable to identify where the memory device is in the boot procedure (e.g., become lost in the boot procedure). In such cases, the memory device may then identify a position (e.g., location) within the boot procedure. The memory device may reorient relative to the boot procedure by using a command, using a timer (e.g., counter), or both.

In some cases, operation 235 may occur after identifying the cache miss. In such cases, the memory device may reorient relative to the boot procedure after determining that the prefetched data expires (e.g., that the data is prefetched but may not be requested). In some examples, if the memory device identifies a cache miss and then a cache hit may occur, the memory device may reorient relative to the boot procedure and evict, from the cache, the data prior to the occurrence of the cache hit. As the boot sequence progresses, the memory device may discard data on any host read hit or the next LBA address match.

In some cases, operation 235 may occur after identifying the cache hit. If a cache hit occurs, the data may be sent to the host device, and the remaining data left in the cache (e.g., unused data) may be invalidated.

In some examples, the memory device may jump ahead in the boot procedure to start prefetching data at the respective address in the boot sequence. For example, if the memory device becomes lost within the boot sequence (e.g., loses a current position or location within the boot sequence), the memory device may reorient itself and jump to the current point in the boot procedure and try again for the prefetching. The memory device may count commands via a counter and move forward in the boot sequence to prefetch. In other examples, the memory device may search the boot sequence to find if the host device skipped ahead in the boot sequence.

The host device may modify the boot sequence. In such cases, the memory device may reorient relative to the boot procedure using a command. The memory device may determine if the next command from the host device matches the last command received at the memory device. If the next command from the host device is not a match with the last command received at the memory device, the memory device may determine if a forward command may be a match with the last command received at the memory device. In such cases, the memory device may be able to look ahead in the boot sequence and identify a problem (e.g., error in the prefetch). By determining a location of the current command in the boot sequence, the memory device may be able to identity a location within the boot procedure and reorient relative to the boot procedure.

The memory device may include a buffer that allows the boot sequence and the host sequence to resync. In some cases, the memory device may include a LBA search match to handle a cache miss and search for the address before or after the cache miss and jump ahead in the boot sequence. The memory device may search for the address before or after the cache miss if the read is random (e.g., not repeated). If the memory device prefetches data, then if the host device misses the boot sequence (e.g., performs a cache miss), then the memory device may keep the prefetched data until the host device reads from the missed prefetched data. If the host device does not re-synchronize with the boot procedure, then the memory device may stop the prefetch or look ahead in boot sequence to reorient relative to the boot procedure.

At 240, the data may be retrieved from the cache. For example, the memory device may retrieve the prefetched data from the shared memory (e.g., cache) if at 225, the memory device that a cache hit occurs. In such cases, the memory device may output, to the host device, the data stored in the cache based on identifying that the data stored in the cache is the data requested by the command.

At 245, the data may be retrieved from the memory array. For example, the memory device may retrieve data from the memory array if at 225/230, the memory device determines that a cache miss occurs. In such cases, the memory device may output, to the host device, data from the memory array.

Figure 3:
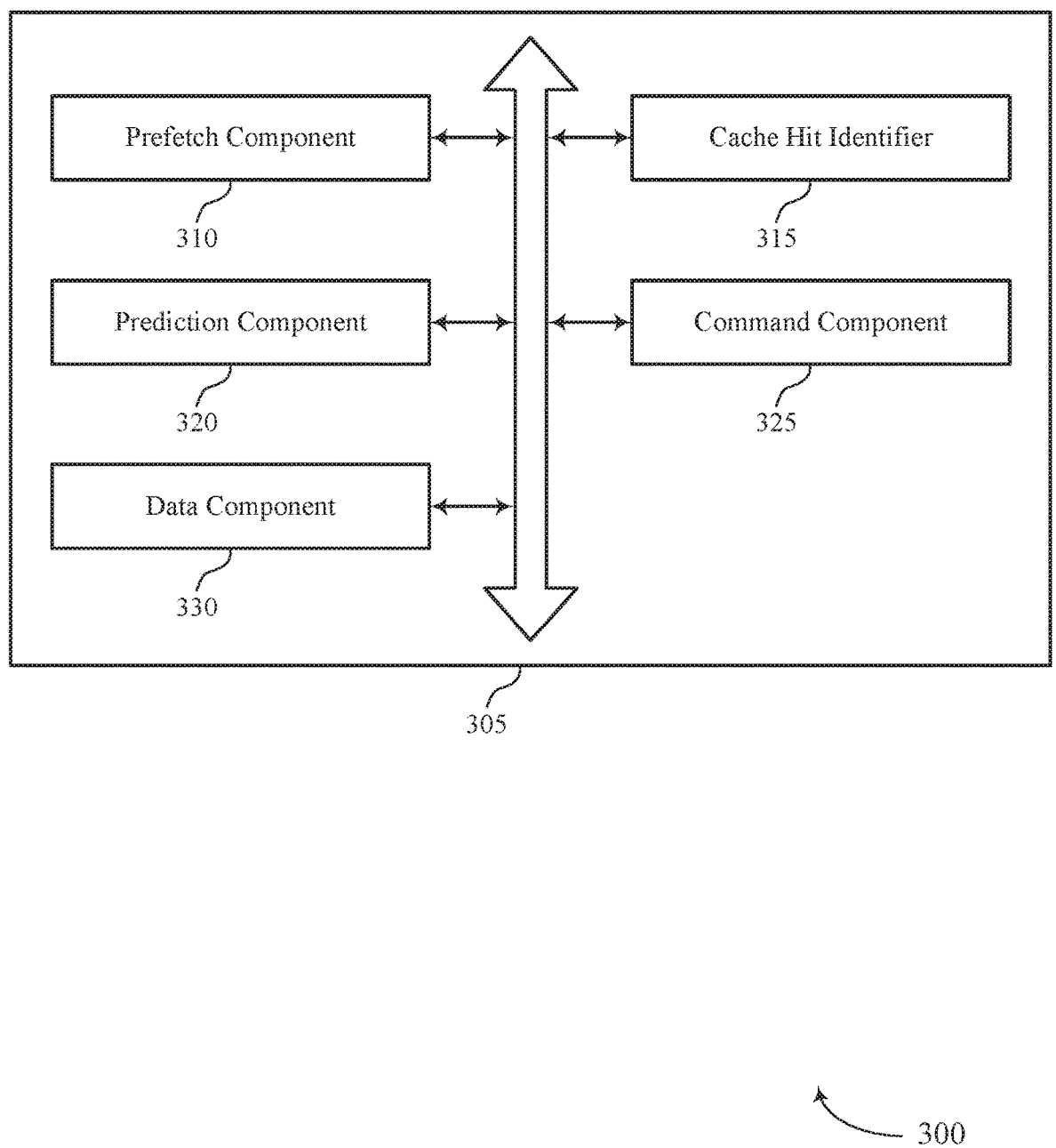
FIG. 3 shows a block diagram of a memory device that supports read prediction during a system boot procedure in accordance with examples as disclosed herein.

FIG. 3 shows a block diagram 300 of a memory device 305 that supports read prediction during a system boot procedure in accordance with examples as disclosed herein. The memory device 305 may be an example of aspects of a memory device as described with reference to FIGS. 1 and 2. The memory device 305 may include a prefetch component 310, a cache hit identifier 315, a prediction component 320, a command component 325, and a data component 330. Each of these components may communicate, directly or indirectly, with one another (e.g., via one or more buses).

The prefetch component 310 may transfer, to a cache of the memory device, first data stored in the memory array indicated by the candidate for the next command. In some examples, the prefetch component 310 may identify an idle period during the boot procedure, where the first data is transferred to the cache during at least a portion of the idle period. In some examples, the prefetch component 310 may identify that the first data associated with the candidate satisfies a size threshold, where transferring the first data to the cache is based on identifying that the first data associated with the candidate satisfies the size threshold.

The cache hit identifier 315 may identify that the first data stored in the cache is the second data requested by the command. In some examples, the cache hit identifier 315 may identify a match between the first address of the first data and the second address of the second data, where identifying that the first data stored in the cache is the second data requested by the command is based on identifying the match.

In some examples, the cache hit identifier 315 may determine whether the second address of the second data is sequential to the first address of the first data, where outputting the first data is based on determining the second address is sequential to the first address. In some examples, the cache hit identifier 315 may detect a sequential access portion of the boot procedure based on determining whether the second address is sequential to the first address, where outputting the first data stored in the cache is based on detecting the sequential access portion of the boot procedure.

The prediction component 320 may identify, for a memory device, a candidate for a next command of a boot procedure associated with a host device based on a boot sequence stored in a memory array of the memory device. In some examples, the prediction component 320 may identify an amount of data transferred to the host device from the memory device, where identifying the candidate for the next command is based on identifying the amount of data transferred. In some examples, the prediction component 320 may identify that the first data associated with the candidate is below a size threshold.

In some examples, the prediction component 320 may identify a first address the first data stored in the memory array indicated by the candidate for the next command, where transferring the first data is based on identifying the first address. In some examples, the prediction component 320 may identify that the second data requested by the next command is not stored in the cache.

In some examples, the prediction component 320 may detect a random access portion of the boot procedure based on identifying that the second data requested by the next command is not stored in the cache, where outputting the second data stored in the memory array is based on detecting the random access portion of the boot procedure. In some examples, the prediction component 320 may receive the next command of the boot procedure associated with the host device, where transferring the first data is based on receiving the next command.

In some examples, the prediction component 320 may store the boot sequence in the memory array, the boot sequence including a set of sequential commands, where identifying the candidate for the next command is based on storing the boot sequence. In some examples, the prediction component 320 may modify the boot sequence based on detecting a change in the boot sequence.

The command component 325 may receive, from the host device, a command that requests second data stored in the memory array as part of the boot procedure and based on transferring the first data. In some examples, the command component 325 may identify a second address the second data stored in the memory array indicated by the command.

The data component 330 may output, to the host device, the first data stored in the cache based on identifying that the first data stored in the cache is the second data requested by the command. In some examples, the data component 330 may refrain from outputting the first data stored in the cache based on identifying that the first data associated with the candidate is below the size threshold. In some examples, the data component 330 may output, to the host system, the second data stored in the memory array based on identifying that the second data requested by the next command is not stored in the cache. In some examples, the data component 330 may evict, from the cache, the first data associated with the candidate based on outputting the second data stored in the memory array.

Figure 4:
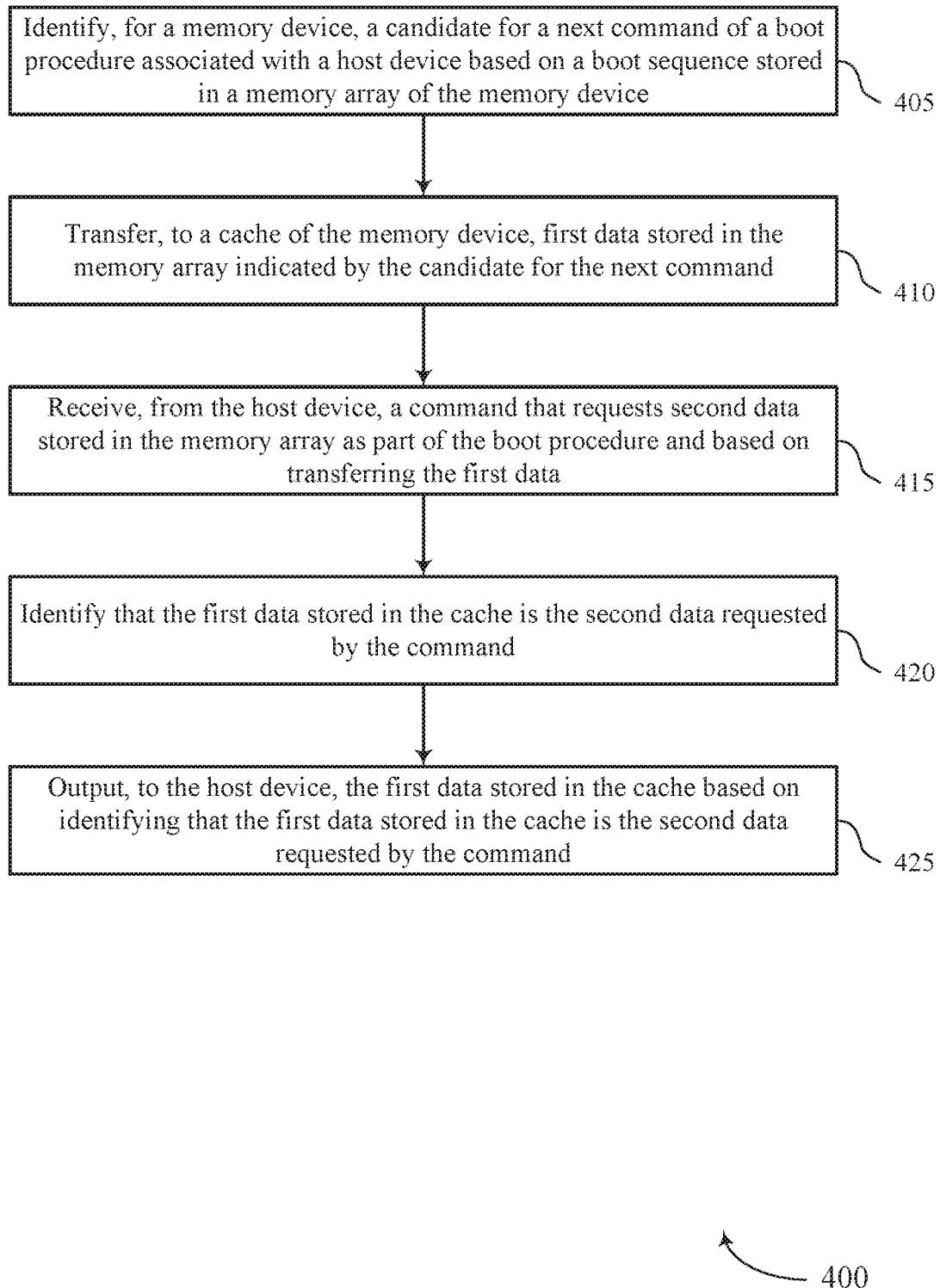
FIG. 4 shows a flowchart illustrating a method or methods that support read prediction during a system boot procedure in accordance with examples as disclosed herein.

FIG. 4 shows a flowchart illustrating a method or methods 400 that supports read prediction during a system boot procedure in accordance with examples as disclosed herein. The operations of method 400 may be implemented by a memory device or its components as described herein. For example, the operations of method 400 may be performed by a memory device as described with reference to FIGS. 1 and 3. In some examples, a memory device may execute a set of instructions to control the functional elements of the memory device to perform the described functions. Additionally or alternatively, a memory device may perform aspects of the described functions using special-purpose hardware.

At 405, the memory device may identify, for a memory device, a candidate for a next command of a boot procedure associated with a host device based on a boot sequence stored in a memory array of the memory device. The operations of 405 may be performed according to the methods described herein. In some examples, aspects of the operations of 405 may be performed by a prediction component as described with reference to FIG. 3.

At 410, the memory device may transfer, to a cache of the memory device, first data stored in the memory array indicated by the candidate for the next command. The operations of 410 may be performed according to the methods described herein. In some examples, aspects of the operations of 410 may be performed by a prefetch component as described with reference to FIG. 3.

At 415, the memory device may receive, from the host device, a command that requests second data stored in the memory array as part of the boot procedure and based on transferring the first data. The operations of 415 may be performed according to the methods described herein. In some examples, aspects of the operations of 415 may be performed by a command component as described with reference to FIG. 3.

At 420, the memory device may identify that the first data stored in the cache is the second data requested by the command. The operations of 420 may be performed according to the methods described herein. In some examples, aspects of the operations of 420 may be performed by a cache hit identifier as described with reference to FIG. 3.

At 425, the memory device may output, to the host device, the first data stored in the cache based on identifying that the first data stored in the cache is the second data requested by the command. The operations of 425 may be performed according to the methods described herein. In some examples, aspects of the operations of 425 may be performed by a data component as described with reference to FIG. 3.

In some examples, an apparatus as described herein may perform a method or methods, such as the method 400. The apparatus may include features, means, or instructions (e.g., a non-transitory computer-readable medium storing instructions executable by a processor) for identifying, for a memory device, a candidate for a next command of a boot procedure associated with a host device based on a boot sequence stored in a memory array of the memory device, transferring, to a cache of the memory device, first data stored in the memory array indicated by the candidate for the next command, receiving, from the host device, a command that requests second data stored in the memory array as part of the boot procedure and based on transferring the first data, identifying that the first data stored in the cache is the second data requested by the command, and outputting, to the host device, the first data stored in the cache based on identifying that the first data stored in the cache is the second data requested by the command.

Some examples of the method 400 and the apparatus described herein may further include operations, features, means, or instructions for identifying an idle period during the boot procedure, where the first data may be transferred to the cache during at least a portion of the idle period.

Some examples of the method 400 and the apparatus described herein may further include operations, features, means, or instructions for identifying an amount of data transferred to the host device from the memory device, where identifying the candidate for the next command may be based on identifying the amount of data transferred.

Some examples of the method 400 and the apparatus described herein may further include operations, features, means, or instructions for identifying that the first data associated with the candidate satisfies a size threshold, where transferring the first data to the cache may be based on identifying that the first data associated with the candidate satisfies the size threshold.

Some examples of the method 400 and the apparatus described herein may further include operations, features, means, or instructions for identifying that the first data associated with the candidate may be below a size threshold, and refraining from outputting the first data stored in the cache based on identifying that the first data associated with the candidate may be below the size threshold.

Some examples of the method 400 and the apparatus described herein may further include operations, features, means, or instructions for identifying a first address the first data stored in the memory array indicated by the candidate for the next command, where transferring the first data may be based on identifying the first address.

Some examples of the method 400 and the apparatus described herein may further include operations, features, means, or instructions for identifying a second address the second data stored in the memory array indicated by the command, and identifying a match between the first address of the first data and the second address of the second data, where identifying that the first data stored in the cache may be the second data requested by the command may be based on identifying the match.

Some examples of the method 400 and the apparatus described herein may further include operations, features, means, or instructions for determining whether the second address of the second data may be sequential to the first address of the first data, where outputting the first data may be based on determining the second address may be sequential to the first address.

Some examples of the method 400 and the apparatus described herein may further include operations, features, means, or instructions for detecting a sequential access portion of the boot procedure based on determining whether the second address may be sequential to the first address, where outputting the first data stored in the cache may be based on detecting the sequential access portion of the boot procedure.

Some examples of the method 400 and the apparatus described herein may further include operations, features, means, or instructions for identifying that the second data requested by the next command may be not stored in the cache, and outputting, to the host system, the second data stored in the memory array based on identifying that the second data requested by the next command may be not stored in the cache.

Some examples of the method 400 and the apparatus described herein may further include operations, features, means, or instructions for evicting, from the cache, the first data associated with the candidate based on outputting the second data stored in the memory array.

Some examples of the method 400 and the apparatus described herein may further include operations, features, means, or instructions for detecting a random access portion of the boot procedure based on identifying that the second data requested by the next command may be not stored in the cache, where outputting the second data stored in the memory array may be based on detecting the random access portion of the boot procedure.

Some examples of the method 400 and the apparatus described herein may further include operations, features, means, or instructions for receiving the next command of the boot procedure associated with the host device, where transferring the first data may be based on receiving the next command.

Some examples of the method 400 and the apparatus described herein may further include operations, features, means, or instructions for storing the boot sequence in the memory array, the boot sequence including a set of sequential commands, where identifying the candidate for the next command may be based on storing the boot sequence, and modifying the boot sequence based on detecting a change in the boot sequence.

Figure 5:
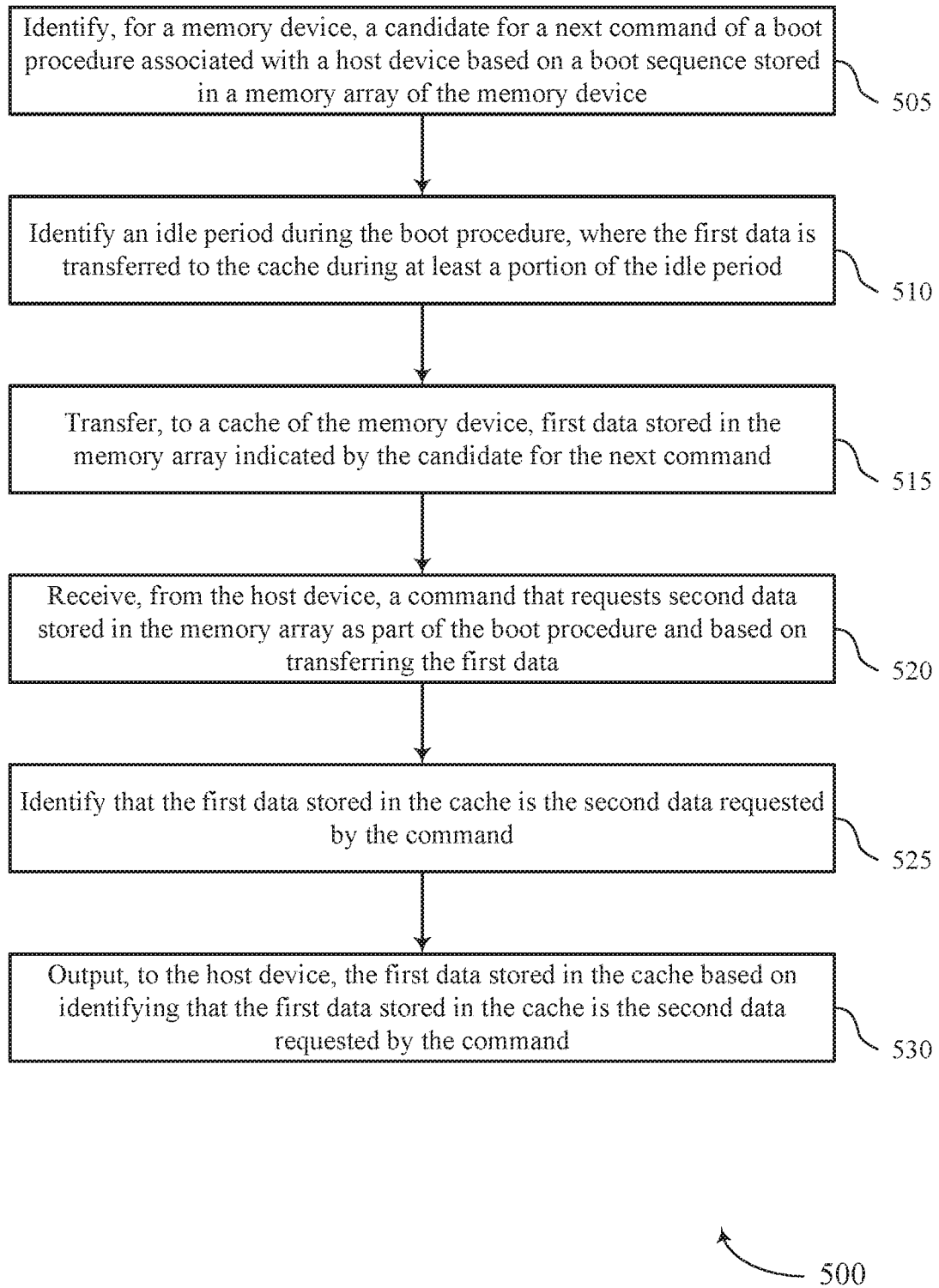
FIG. 5 shows a flowchart illustrating a method or methods that support read prediction during a system boot procedure in accordance with examples as disclosed herein.

FIG. 5 shows a flowchart illustrating a method or methods 500 that supports read prediction during a system boot procedure in accordance with examples as disclosed herein. The operations of method 500 may be implemented by a memory device or its components as described herein. For example, the operations of method 500 may be performed by a memory device as described with reference to FIGS. 1 and 3. In some examples, a memory device may execute a set of instructions to control the functional elements of the memory device to perform the described functions. Additionally or alternatively, a memory device may perform aspects of the described functions using special-purpose hardware.

At 505, the memory device may identify, for a memory device, a candidate for a next command of a boot procedure associated with a host device based on a boot sequence stored in a memory array of the memory device. The operations of 505 may be performed according to the methods described herein. In some examples, aspects of the operations of 505 may be performed by a prediction component as described with reference to FIG. 3.

At 510, the memory device may identify an idle period during the boot procedure, where the first data is transferred to the cache during at least a portion of the idle period. The operations of 510 may be performed according to the methods described herein. In some examples, aspects of the operations of 510 may be performed by a prefetch component as described with reference to FIG. 3.

At 515, the memory device may transfer, to a cache of the memory device, first data stored in the memory array indicated by the candidate for the next command. The operations of 515 may be performed according to the methods described herein. In some examples, aspects of the operations of 515 may be performed by a prefetch component as described with reference to FIG. 3.

At 520, the memory device may receive, from the host device, a command that requests second data stored in the memory array as part of the boot procedure and based on transferring the first data. The operations of 520 may be performed according to the methods described herein. In some examples, aspects of the operations of 520 may be performed by a command component as described with reference to FIG. 3.

At 525, the memory device may identify that the first data stored in the cache is the second data requested by the command. The operations of 525 may be performed according to the methods described herein. In some examples, aspects of the operations of 525 may be performed by a cache hit identifier as described with reference to FIG. 3.

At 530, the memory device may output, to the host device, the first data stored in the cache based on identifying that the first data stored in the cache is the second data requested by the command. The operations of 530 may be performed according to the methods described herein. In some examples, aspects of the operations of 530 may be performed by a data component as described with reference to FIG. 3.

It should be noted that the methods described herein are possible implementations, and that the operations and the steps may be rearranged or otherwise modified and that other implementations are possible. Furthermore, portions from two or more of the methods may be combined.

An apparatus is described. The apparatus may include a memory array, a cache, and a control component coupled with the memory array and configured to cause the apparatus to identify, for a memory device, a candidate for a next command of a boot procedure associated with a host device based on a boot sequence stored in a memory array of the memory device, transfer, to a cache of the memory device, first data stored in the memory array indicated by the candidate for the next command, receive, from the host device, a command that requests second data stored in the memory array as part of the boot procedure and based on transferring the first data, identify that the first data stored in the cache is the second data requested by the command, and output, to the host device, the first data stored in the cache based on identifying that the first data stored in the cache is the second data requested by the command.

Some examples may include the control component that is further configured to cause the apparatus to identify an idle period during the boot procedure, where the first data may be transferred to the cache during at least a portion of the idle period.

Some examples may include the control component that is further configured to cause the apparatus to identify an amount of data transferred to the host device from the memory device, where identifying the candidate for the next command may be based on identifying the amount of data transferred.

Some examples may include the control component that is further configured to cause the apparatus to identify that the first data associated with the candidate satisfies a size threshold, where transferring the first data to the cache may be based on identifying that the first data associated with the candidate satisfies the size threshold.

Some examples may include the control component that is further configured to cause the apparatus to identify that the first data associated with the candidate may be below a size threshold and refrain from outputting the first data stored in the cache based on identifying that the first data associated with the candidate may be below the size threshold.

Some examples may include the control component that is further configured to cause the apparatus to identify a first address the first data stored in the memory array indicated by the candidate for the next command, where transferring the first data may be based on identifying the first address.

Some examples may include the control component that is further configured to cause the apparatus to identify a second address the second data stored in the memory array indicated by the command and identify a match between the first address of the first data and the second address of the second data, where identifying that the first data stored in the cache may be the second data requested by the command may be based on identifying the match.

Some examples may include the control component that is further configured to cause the apparatus to determine whether the second address of the second data may be sequential to the first address of the first data, where outputting the first data may be based on determining the second address may be sequential to the first address.

Some examples may include the control component that is further configured to cause the apparatus to detect a sequential access portion of the boot procedure based on determining whether the second address may be sequential to the first address, where outputting the first data stored in the cache may be based on detecting the sequential access portion of the boot procedure.

Some examples may include the control component that is further configured to cause the apparatus to identify that the second data requested by the next command may be not stored in the cache and output, to the host system, the second data stored in the memory array based on identifying that the second data requested by the next command may be not stored in the cache.

Some examples may include the control component that is further configured to cause the apparatus to evict, from the cache, the first data associated with the candidate based on outputting the second data stored in the memory array.

Some examples may include the control component that is further configured to cause the apparatus to detect a random access portion of the boot procedure based on identifying that the second data requested by the next command may be not stored in the cache, where outputting the second data stored in the memory array may be based on detecting the random access portion of the boot procedure.

Some examples may include the control component that is further configured to cause the apparatus to receive the next command of the boot procedure associated with the host device, where transferring the first data may be based on receiving the next command.

Some examples may include the control component that is further configured to cause the apparatus to store the boot sequence in the memory array, the boot sequence including a set of sequential commands, where identifying the candidate for the next command may be based on storing the boot sequence and modify the boot sequence based on detecting a change in the boot sequence.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal, however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may comprise RAM, ROM, electrically erasable programmable read-only memory (EEPROM), compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus comprising:
a memory array;
a cache; and
a control component coupled with the memory array and configured to cause the apparatus to:
identify, for a memory device, a candidate for a next command of a boot procedure associated with a host device based at least in part on a boot sequence stored in the memory array of the memory device;
transfer, to the cache of the memory device, first data stored in the memory array indicated by the candidate for the next command, the transferring based at least in part on a size of the first data to be transferred satisfying a size threshold, whether the first data to be transferred is static for each boot sequence of a plurality of boot sequences, or both, wherein the first data is static based at least in part on the first data being data that is transferred during each boot sequence of the plurality of boot sequences or being stored in a same location during each boot sequence of the plurality of boot sequences, or both;
receive, from the host device, a command that requests second data stored in the memory array as part of the boot procedure and based at least in part on transferring the first data;
identify that a first address of the first data stored in the cache is the same as a second address of the second data requested by the command; and
output, to the host device, the first data stored in the cache based at least in part on identifying that the first address of the first data stored in the cache is the same as the second address of the second data requested by the command.

2. The apparatus of claim 1, wherein the control component is further configured to cause the apparatus to:
identify an idle period during the boot procedure, wherein the first data is transferred to the cache during at least a portion of the idle period.

3. The apparatus of claim 1, wherein the control component is further configured to cause the apparatus to:
identify an amount of data transferred to the host device from the memory device, wherein identifying the candidate for the next command is based at least in part on identifying the amount of data transferred.

4. The apparatus of claim 1, wherein the control component is further configured to cause the apparatus to:
identify that the first data associated with the candidate satisfies the size threshold, wherein transferring the first data to the cache is based at least in part on identifying that the first data associated with the candidate satisfies the size threshold.

5. The apparatus of claim 1, wherein the control component is further configured to cause the apparatus to:
identify the first address of the first data stored in the memory array indicated by the candidate for the next command, wherein transferring the first data is based at least in part on identifying the first address.

6. The apparatus of claim 5, wherein the control component is further configured to cause the apparatus to:
identify the second address of the second data stored in the memory array indicated by the command; and
identify a match between the first address of the first data and the second address of the second data, wherein identifying that the first address of the first data stored in the cache is the same as the second address of the second data requested by the command is based at least in part on identifying the match.

7. The apparatus of claim 6, wherein the control component is further configured to cause the apparatus to:
determine whether the second address of the second data is sequential to the first address of the first data, wherein outputting the first data is based at least in part on determining whether the second address is sequential to the first address.

8. The apparatus of claim 7, wherein the control component is further configured to cause the apparatus to:
detect a sequential access portion of the boot procedure based at least in part on determining whether the second address is sequential to the first address, wherein outputting the first data stored in the cache is based at least in part on detecting the sequential access portion of the boot procedure.

9. The apparatus of claim 1, wherein the control component is further configured to cause the apparatus to:
identify that the second data requested by the next command is not stored in the cache; and
output, to the host device, the second data stored in the memory array based at least in part on identifying that the second data requested by the next command is not stored in the cache.

10. The apparatus of claim 9, wherein the control component is further configured to cause the apparatus to:
evict, from the cache, the first data associated with the candidate based at least in part on outputting the second data stored in the memory array.

11. The apparatus of claim 9, wherein the control component is further configured to cause the apparatus to:
detect a random access portion of the boot procedure based at least in part on identifying that the second data requested by the next command is not stored in the cache, wherein outputting the second data stored in the memory array is based at least in part on detecting the random access portion of the boot procedure.

12. The apparatus of claim 1, wherein the control component is further configured to cause the apparatus to:
receive the next command of the boot procedure associated with the host device, wherein transferring the first data is based at least in part on receiving the next command.

13. The apparatus of claim 1, wherein the control component is further configured to cause the apparatus to:
store the boot sequence in the memory array, the boot sequence comprising a set of sequential commands, wherein identifying the candidate for the next command is based at least in part on storing the boot sequence; and
modify the boot sequence based at least in part on detecting a change in the boot sequence.

14. An apparatus comprising:
a memory array;
a cache; and
a control component coupled with the memory array and configured to cause the apparatus to:
identify, for a memory device, a candidate for a next command of a boot procedure associated with a host device based at least in part on a boot sequence stored in the memory array of the memory device;
transfer, to the cache of the memory device, first data stored in the memory array indicated by the candidate for the next command;
identify that the first data associated with the candidate is below a size threshold;
refrain from outputting the first data stored in the cache based at least in part on identifying that the first data associated with the candidate is below the size threshold;
receive, from the host device, a command that requests second data stored in the memory array as part of the boot procedure and based at least in part on transferring the first data;
identify that the first data stored in the cache is the second data requested by the command; and
output, to the host device, the first data stored in the cache based at least in part on identifying that the first data stored in the cache is the second data requested by the command.

15. A method, comprising:
identifying, for a memory device, a candidate for a next command of a boot procedure associated with a host device based at least in part on a boot sequence stored in a memory array of the memory device;
transferring, to a cache of the memory device, first data stored in the memory array indicated by the candidate for the next command, the transferring based at least in part on a size of the first data to be transferred satisfying a size threshold, whether the first data to be transferred is static for each boot sequence of a plurality of boot sequences, or both, wherein the first data is static based at least in part on the first data being data that is transferred during each boot sequence of the plurality of boot sequences or being stored in a same location during each boot sequence of the plurality of boot sequences, or both;
receiving, from the host device, a command that requests second data stored in the memory array as part of the boot procedure and based at least in part on transferring the first data;

identifying that a first address of the first data stored in the cache is the same as a second address of the second data requested by the command; and outputting, to the host device, the first address of the first data stored in the cache based at least in part on identifying that the first data stored in the cache is the same as the second address of the second data requested by the command.

16. The method of claim 15, further comprising:

identifying an idle period during the boot procedure, wherein the first data is transferred to the cache during at least a portion of the idle period.

17. The method of claim 16, further comprising:

identifying an amount of data transferred to the host device from the memory device, wherein identifying the candidate for the next command is based at least in part on identifying the amount of data transferred.

18. The method of claim 15, further comprising:

identifying that the first data associated with the candidate satisfies the size threshold, wherein transferring the first data to the cache is based at least in part on identifying that the first data associated with the candidate satisfies the size threshold.

19. The method of claim 15, further comprising:

identifying the first address of the first data stored in the memory array indicated by the candidate for the next command, wherein transferring the first data is based at least in part on identifying the first address.

20. The method of claim 19, further comprising:

identifying the second address of the second data stored in the memory array indicated by the command; and identifying a match between the first address of the first data and the second address of the second data, wherein identifying that the first address of the first data stored in the cache is the same as the second address of the second data requested by the command is based at least in part on identifying the match.

21. The method of claim 15, further comprising:

identifying that the second data requested by the next command is not stored in the cache; and outputting, to the host device, the second data stored in the memory array based at least in part on identifying that the second data requested by the next command is not stored in the cache.

22. The method of claim 21, further comprising:

evicting, from the cache, the first data associated with the candidate based at least in part on outputting the second data stored in the memory array.

23. A method, comprising:

identifying, for a memory device, a candidate for a next command of a boot procedure associated with a host device based at least in part on a boot sequence stored in a memory array of the memory device;

transferring, to a cache of the memory device, first data stored in the memory array indicated by the candidate for the next command;

identifying that the first data associated with the candidate is below a size threshold;

refraining from outputting the first data stored in the cache based at least in part on identifying that the first data associated with the candidate is below the size threshold;

receiving, from the host device, a command that requests second data stored in the memory array as part of the boot procedure and based at least in part on transferring the first data;

identifying that the first data stored in the cache is the second data requested by the command; and outputting, to the host device, the first data stored in the cache based at least in part on identifying that the first data stored in the cache is the second data requested by the command.

24. A non-transitory computer-readable medium storing code comprising instructions, which when executed by a processor of an electronic device, cause the electronic device to:

identify, for a memory device, a candidate for a next command of a boot procedure associated with a host device based at least in part on a boot sequence stored in a memory array of the memory device;

transfer, to a cache of the memory device, first data stored in the memory array indicated by the candidate for the next command, the transferring based at least in part on a size of the first data to be transferred satisfying a size threshold, whether the first data to be transferred is static for a plurality of boot sequences, or both, wherein the first data is static based at least in part on the first data being data that is transferred during each boot sequence of the plurality of boot sequences or being stored in a same location during each boot sequence of the plurality of boot sequences, or both;

receive, from the host device, a command that requests second data stored in the memory array as part of the boot procedure and based at least in part on transferring the first data;

identify that a first address of the first data stored in the cache is the same as a second address of the second data requested by the command; and output, to the host device, the first data stored in the cache based at least in part on identifying that the first address of the first data stored in the cache is the same as the second address of the second data requested by the command.

25. The non-transitory computer-readable medium of claim 24, wherein the instructions are further executable by the processor to:

identify an idle period during the boot procedure, wherein the first data is transferred to the cache during at least a portion of the idle period.

* * * * *